(12) United States Patent
Inoue et al.

(10) Patent No.: US 8,564,709 B2
(45) Date of Patent: *Oct. 22, 2013

(54) IMAGE QUALITY SELECTING METHOD AND DIGITAL CAMERA

(75) Inventors: Masashi Inoue, Asaka (JP); Yoshikuni Nishiura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 13/162,471

(22) Filed: Jun. 16, 2011

(65) Prior Publication Data
US 2011/0242364 A1    Oct. 6, 2011

Related U.S. Application Data

(60) Continuation of application No. 12/185,173, filed on Aug. 4, 2008, now Pat. No. 7,990,456, which is a division of application No. 09/867,607, filed on May 31, 2001, now Pat. No. 7,423,683.

(30) Foreign Application Priority Data

May 31, 2000    (JP) .................................. 2000-162836

(51) Int. Cl.
H04N 5/222    (2006.01)
H04N 5/76    (2006.01)
G06F 3/048    (2013.01)

(52) U.S. Cl.
USPC ..................... 348/333.02; 348/231.6; 715/810

(58) Field of Classification Search
USPC ............... 348/333.01, 333.02, 333.12, 231.1, 348/231.2, 231.6; 715/810
See application file for complete search history.

(56) References Cited

U.S. PATENT DOCUMENTS 4,959,735 A    9/1990    Kawai
5,138,459 A *    8/1992    Roberts et al. ............. 348/231.6

(Continued)

FOREIGN PATENT DOCUMENTS

JP    62252583 A    11/1987
JP    7-38785 A    2/1995

(Continued)

OTHER PUBLICATIONS

Translation of JP 62-252583 A.*

(Continued)

*Primary Examiner* — John Villecco
(74) *Attorney, Agent, or Firm* — Birch, Stewart, Kolasch & Birch, LLP

(57) ABSTRACT

Selection candidates for number of imaging pixels and for an image compression rate are displayed in a two-dimensional arrangement on a setting screen for setting an image quality, and combinations of selectable number of image pixels and a compression rate can be presented to a user. An instruction for moving a cursor which displays a selected position on the screen is received, and a setting can be changed to a number of pixels and a compression rate which are pointed by the cursor after a position of the cursor is designated. More specifically, numbers of pixels to be selected are 2400×1800, 1280×960, and 640×480, and compression rates to be selected are Fine, Normal, and Basic. When the user selects the number of pixels, candidates of the selectable compression rate for the number of pixels are displayed. A number of photographable images and remaining time for recording a moving image which are calculated from a capacity of a storage medium are preferably displayed in combination in accordance with combinations of the number of pixels and the compression rate.

8 Claims, 12 Drawing Sheets

SET PIXEL/QUALITY

|  | FINE | NORMAL | BASIC |
|---|---|---|---|
| 2400 | 36 | 77 | 189 |
| 1280 | 101 | 198 |  |
| 640 |  | 663 |  |

SET → [ EXECUTE ]    STOP → [ CANCEL ]

(56) References Cited

U.S. PATENT DOCUMENTS

| | | |
|---|---|---|
| 5,402,170 A | 3/1995 | Parulski et al. |
| 6,005,613 A | 12/1999 | Endsley et al. |
| 6,314,206 B1 | 11/2001 | Sato |
| 6,337,928 B1 | 1/2002 | Takahashi et al. |
| 6,407,772 B2 | 6/2002 | Mizoguchi |
| 6,411,771 B1 | 6/2002 | Aotake |
| 6,654,498 B2 | 11/2003 | Takahashi et al. |
| 6,683,653 B1 | 1/2004 | Miyake et al. |
| 6,930,717 B1 | 8/2005 | Kobayashi et al. |
| 6,937,281 B1 | 8/2005 | Ogawa |
| 6,952,229 B1 | 10/2005 | Takahashi et al. |
| 7,068,307 B2 | 6/2006 | Hyodo |
| 7,265,780 B2 | 9/2007 | Tanaka et al. |
| 7,355,620 B2 | 4/2008 | Ikehata et al. |
| 7,990,456 B2 * | 8/2011 | Inoue et al. .............. 348/333.02 |
| 2002/0030754 A1 | 3/2002 | Sugimoto |
| 2004/0027473 A1 | 2/2004 | Suzuki |
| 2005/0248542 A1 | 11/2005 | Sawanobori |
| 2006/0072028 A1 | 4/2006 | Hong |
| 2007/0058947 A1 | 3/2007 | Yoshida |
| 2008/0036895 A1 | 2/2008 | Kosaka |
| 2008/0084398 A1 | 4/2008 | Ito et al. |

FOREIGN PATENT DOCUMENTS

| | | |
|---|---|---|
| JP | 8-339039 A | 12/1996 |
| JP | 09168109 A | 6/1997 |
| JP | 10-98668 A | 4/1998 |
| JP | 10-136238 A | 5/1998 |
| JP | 2000-115588 A | 4/2000 |
| JP | 2000-137286 A | 5/2000 |

OTHER PUBLICATIONS

Canon; "PowerShot S10 Digital Camera: Camera User Guide"; 1999; Canon; p. 41.
Steve's DigiCams: "PowerShot S10 User Review", [Online] 1999, Internet Address: <http://steves-digicams.compd/canon_s10.pdf>.

* cited by examiner

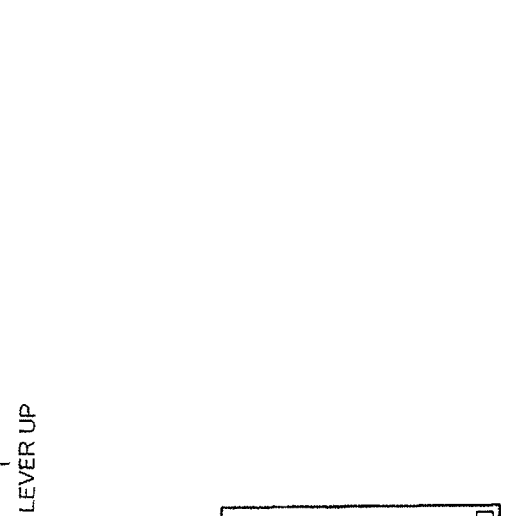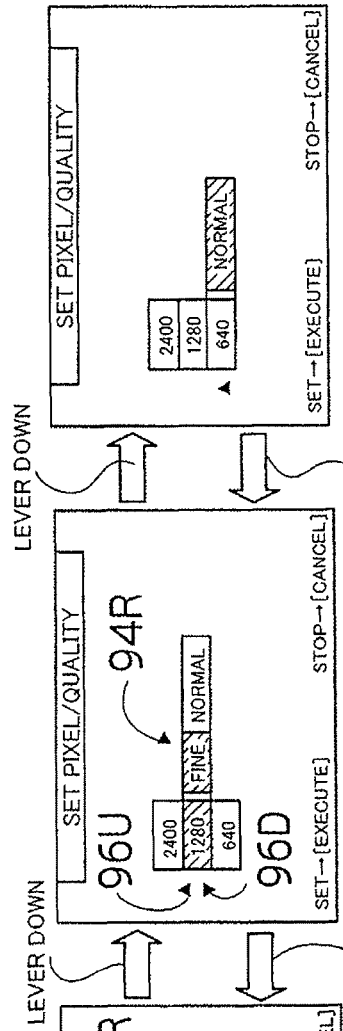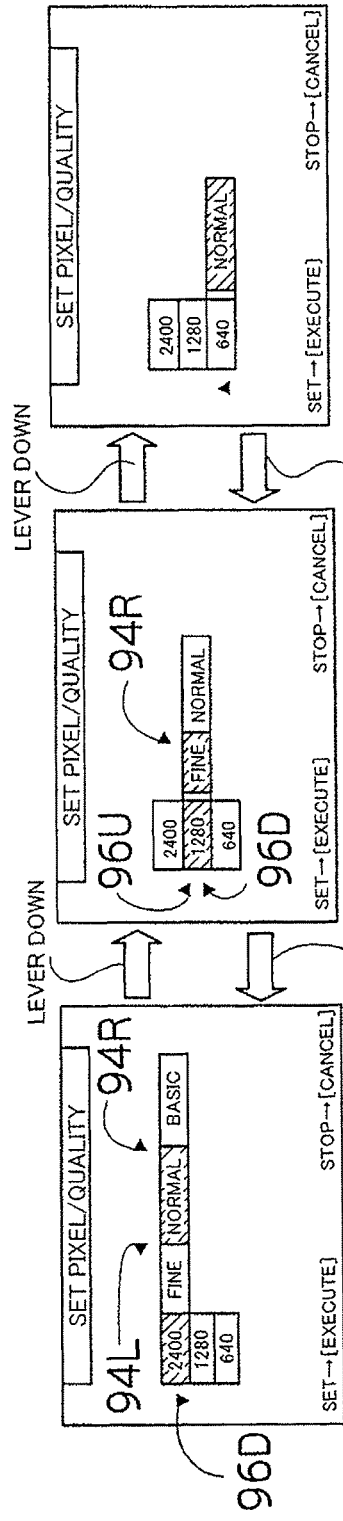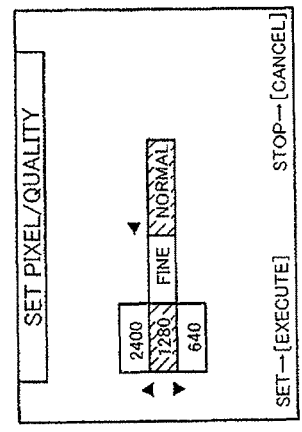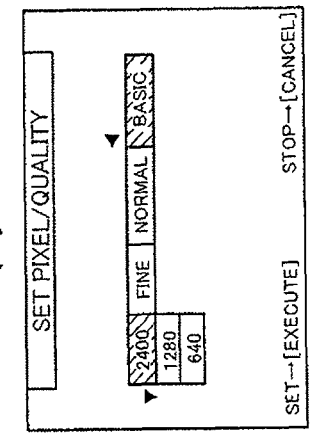

FIG. 10

| | FINE | NORMAL | BASIC |
|---|---|---|---|
| 2400 | 36 | 77 | 189 |
| 1280 | 101 | 198 | |
| 640 | | 663 | |

SET PIXEL/QUALITY

SET → [ EXECUTE ]   STOP → [ CANCEL ]

F I G. 1 1

| SET PIXEL/QUALITY | | | |
|---|---|---|---|
| | FINE | NORMAL | BASIC |
| 2400 | 36 | 76 | 187 |
| 1280 | 100 | 196 | |
| 640 | | 656 | |

SET→[EXECUTE]   STOP→[CANCEL]

F I G. 1 2 ( a )

WHEN "FINE" IS SELECTED

| FINE | 2400 | 1280 |
|---|---|---|
| NORMAL | | |
| BASIC | | |

F I G. 1 2 ( b )

WHEN "NORMAL" IS SELECTED

| FINE | | | |
|---|---|---|---|
| NORMAL | 2400 | 1280 | 640 |
| BASIC | | | |

F I G. 1 2 ( c )

WHEN "BASIC" IS SELECTED

| FINE | |
|---|---|
| NORMAL | |
| BASIC | 1280 |

FIG. 13

| QUALITY/PIXEL | | | 410 SECONDS |
|---|---|---|---|
| | 2400 | 1280 | 640 |
| FINE | 36 | 101 | //// |
| NORMAL | 77 | 198 | 663 |
| BASIC | 189 | //// | //// |

FIG. 14

| QUALITY/PIXEL | | | 330 SECONDS |
|---|---|---|---|
| | 2400 | 1280 | 640 |
| FINE | 29 | 81 | //// |
| NORMAL | 62 | 159 | 533 |
| BASIC | 152 | //// | //// |

F I G. 1 5

|  | FINE | NORMAL | BASIC |
|---|---|---|---|
| 2400 | 36 | 77<br>12s | 189<br>48s |
| 1280 | 101 | 198<br>25s |  |
| 640 |  | 663<br>64s |  |

F I G. 1 6 (a)

| PIXEL/QUALITY | | | |
|---|---|---|---|
| | 77 IMAGES/410 SECONDS | | |
| 2400 | FINE | NORMAL | BASIC |
| 1280 | | | |
| 640 | | | |

F I G. 1 6 (b)

| PIXEL/QUALITY | | |
|---|---|---|
| | 198 IMAGES/410 SECONDS | |
| 2400 | | |
| 1280 | FINE | NORMAL |
| 640 | | |

F I G. 1 6 (c)

| PIXEL/QUALITY | |
|---|---|
| | 663 IMAGES/410 SECONDS |
| 2400 | |
| 1280 | |
| 640 | NORMAL |

FIG. 17 (a)

| QUALITY/PIXEL | | | |
|---|---|---|---|
| | 101 IMAGES/410 SECONDS | | |
| FINE | 2400 | //1280// | |
| NORMAL | | | |
| BASIC | | | |

FIG. 17 (b)

| QUALITY/PIXEL | | | |
|---|---|---|---|
| | 198 IMAGES/410 SECONDS | | |
| FINE | | | |
| NORMAL | 2400 | //1280// | 640 |
| BASIC | | | |

FIG. 17 (c)

| QUALITY/PIXEL | | |
|---|---|---|
| | 189 IMAGES/410 SECONDS | |
| FINE | | |
| NORMAL | | |
| BASIC | //2400// | |

IMAGE QUALITY SELECTING METHOD AND DIGITAL CAMERA

This application is a Continuation of application Ser. No. 12/185,173, filed on Aug. 4, 2008 now U.S. Pat. No. 7,990,456. Application Ser. No. 12/185,173 is a Divisional of application Ser. No. 09/867,607, filed on May 31, 2001, now U.S. Pat. No. 7,423,683 which claims the benefit of priority of Application No. 2000-162836, filed in Japan on May 31, 2000. The entire contents of all of the above-identified applications are hereby incorporated by reference.

BACKGROUND OF THE INVENTION

1. Field of the Invention

The present invention relates to an image quality selecting method applied for a digital camera, and a camera which uses the image quality selecting method.

2. Description of the Related Art

An image quality of a recorded image in a digital camera is usually specified by two parameters, number of imaging pixels and an image compression rate. In a conventional digital camera, the number of imaging pixels and the image compression rate are independent setting sections, and they are set individually, or a combination of a specific number of imaging pixels and a specific image compression rate is selected so as to set the number of imaging pixels and the image compression rate together.

However, the digital camera in which the number of pixels and the compression rate are individually set has a disadvantage in that a type of the compression rate cannot be confirmed at the time of selecting the number of pixels, while a type of the pixels cannot be confirmed at the time of selecting the compression rate. Moreover, If the digital camera is a type in which the combination of the number of pixels and the compression rate is selected, the combination is presented only by a list or, evaluation of an overall image quality is presented only by simple symbols such as numbers of asterisks. As a result, contents of the combination of the number of pixels and the compression rate which are actually set cannot be easily confirmed.

Further, if a menu for setting the number of imaging pixels and the image compression rate is a special mode (such as a set-up mode) in the conventional digital camera, the number of photographable images cannot be confirmed when the user selects the number of pixels and the compression rate with the set-up mode. On the contrary, if a setting for the number of pixels and the compression rate can be changed in a still image mode, number of photographable images is changed as changing the number of pixels and the compression rate; however, a camera with an information display screen in addition to a liquid crystal display (LCD) for image display does not display a remaining time for recording a moving image even though the number of photographable images is changed.

SUMMARY OF THE INVENTION

The present invention has been developed in view of the above-described circumstances, and has as its object the provision of an image quality selecting method and a digital camera by which a pattern of combination of the number of pixels and the compression rate can be presented for a user to understand easily; at the same time, the image quality selecting method and the digital camera achieves a function for aiding the user to select a combination for an image quality.

In order to achieve the above-described objects, the present invention is directed to an image quality selecting method comprising the following steps: displaying selectable candidates for a number of imaging pixels and image compression rates in a two-dimensional arrangement on a setting screen for setting an image quality; presenting to a user combinations of selectable number of imaging pixels and the image compression rates and at the same time receiving an instruction for moving a cursor on the setting screen; and changing a setting to the number of pixels and the image compression rate which are pointed by the cursor after designating a position of the cursor.

According to the present invention, selectable candidates for the number of imaging pixels and for the image compression rates are presented to the user in the two-dimensional arrangement on the setting screen as a user interface for designating the two parameters, the number of imaging pixels and the compression rate, which specify the image quality, so that the combination arrangement is designated by moving the cursor. Therefore, the user can understand at once the contents of the combination of the number of imaging pixels and the image compression rates, and can easily designate the image quality without being confused.

The user can select the image quality in consideration of the number of photographable images based on the number of imaging pixels and the image compression rate which are selected with the cursor, specially by displaying the number of photographable images on the setting screen.

Instead of the number of photographable images, the remaining time for recording a moving image is displayed on the screen while the moving image is being recorded. In addition, a camera which can change the still image mode and the moving image mode may also display the number of photographable images and the remaining time for recording the moving image together.

According to another embodiment of the present invention, information on a combination of the number of imaging pixels and the image compression rate which have been set in a previous setting is stored; and when one of the number of imaging pixels and the image compression rate is changed by an operation of the user, the cursor automatically moves to a position of the other of the number of imaging pixels and the image compression rate in the previous setting according to the stored information. Thus, contents which have been previously set can be easily reset, improving operability of the digital camera.

When one of the number of imaging pixels and the image compression rate is changed by an operation of the user, the cursor can automatically move to a position of the other of the number of imaging pixels and the image compression rate in a predetermined default.

In order to achieve the above-described method, the present invention is directed to a digital camera, comprising: a taking lens; an imaging device that converts light which enters through the taking lens into electric signals; a signal processing part for processing the signals outputted from the imaging device; a recording instruction input operation part that instructs start of recording in order to obtain an image; a recording device that records an image in a storage medium, the image being photographed in response to an operation of the recording instruction input operation part; a display device that displays a setting screen for setting an image quality; a display control device that displays selectable candidates for number of imaging pixels and image compression rates on the setting screen of the display device, and presenting combinations of selectable numbers of pixels and compression rates; a cursor operating device that inputs an instruction for moving a cursor, which points a selected position on the setting screen of the display device; a designation instruction device that instructs a designation of a selected position, which is indicated by the cursor; and an image quality setting device that changes a setting to the number of pixels and the image compression rate which are pointed by the cursor in accordance with a designated instruction from the designation instruction device.

The digital camera of the present invention further comprises a calculation device that calculating at least one of the number of photographable images and a remaining time for recording a moving image from capacity of the storage medium with respect to each combination of the number of pixels and the image compression rate; and the at least one of the number of photographable images and the remaining time calculated by the calculation device with respect to each combination is displayed on the setting screen.

A table is prepared in which one of the selectable candidates for the number of imaging pixels and the image compression rate is horizontally lined up as a row, and the other is vertically lined up as a column on the setting screen; and at least one of the number of photographable images and the remaining time for recording a moving image for the combination is displayed in each cell of the table.

The digital camera of the present invention further comprises a storage device that stores information on a combination of the number of imaging pixels and the image compression rate which have been set in a previous setting; and when one of the number of imaging pixels and the image compression rate is changed, the display control device automatically moves the cursor to a position of the other of the number of imaging pixels and the image compression rate in the previous setting according to the information stored in the storage device.

When one of the number of imaging pixels and the image compression rate is changed, the display control device can move the cursor to a position of the other of the number of imaging pixels and the image compression rate in a predetermined default.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 7(a), 7(b), 7(c), 7(d) and 7(e) are views showing states where setting screens (menu screens) for an image quality are changed;

FIG. 10 is a view exemplifying a screen in a case where the combination of the selectable number of pixels and the compression rates as well as the number of photographable images are displayed together;

FIG. 11 is a view showing an example for changing display of the number of photographable images after recording once from the state in FIG. 10;

FIGS. 12(a), 12(b) and 12(c) are views showing displays for another embodiment of the present invention;

FIG. 13 is a view showing a display example of a remaining time for recording a moving image;

FIG. 14 is a view showing an example for changing display of the number of photographable images and the remaining time for recording the moving image after recording the moving image for 80 seconds from the state in FIG. 13;

FIG. 15 is a view showing an example for displaying the number of photographable images and the remaining time for recording the moving image are displayed at the same time in a case where an image quality of a still image and an image quality of a moving image can both be changed;

FIGS. 16(a), 16(b) and 16(c) are views showing another display for the number of photographable images and the remaining time for recording the moving image; and FIGS. 17(a), 17(b) and 17(c) are views showing still another display in addition to the display of the number of photographable image and the remaining time for recording the moving image.

DETAILED DESCRIPTION OF THE PREFERRED EMBODIMENTS

Hereunder preferred embodiments of the present invention will be described in accordance with the accompanied drawings.

FIGS. 1-5 are a front view, a rear view, a plan view, a bottom view, and a right-side view, respectively, showing an external appearance of a digital camera 10. The digital camera 10 with an audio play is rectangular as shown in FIGS. 1-5 and pocket-sized.

Figure 1:
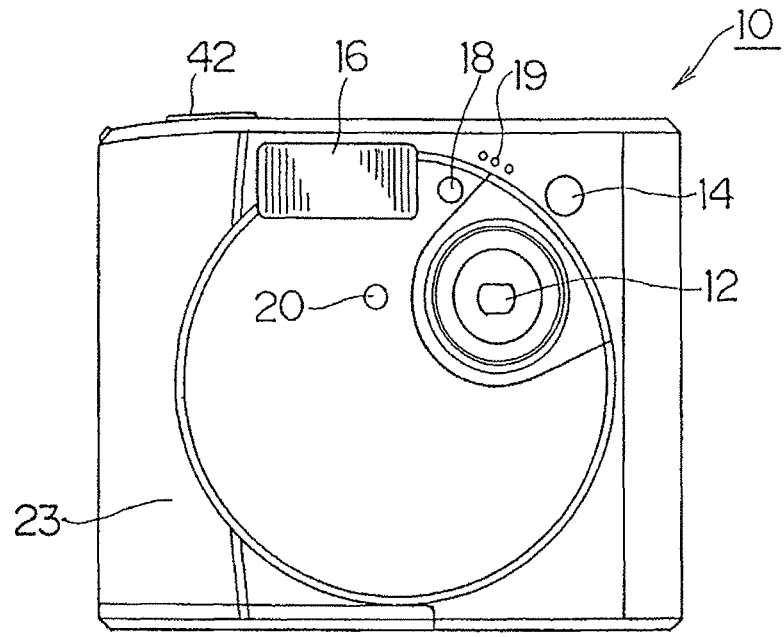
FIG. 1 is a front view of a digital camera in an embodiment of the present invention.

A collapsible taking lens 12, a viewfinder window 14, an electronic flash 16, an electronic flash light adjusting sensor 18, a microphone 19, and a self-timer lamp 20 are provided at a front face of the digital camera 10. A lens cover (not shown in FIG. 1 but shown in FIG. 6 with a reference number 22) which is opened and closed at a collapsing position of the taking lens 12 is also provided at the front face of the digital camera 10. In FIG. 1, the lens cover 22 is opened, and the reference number 23 corresponds with a grip of the camera.

Figure 2:
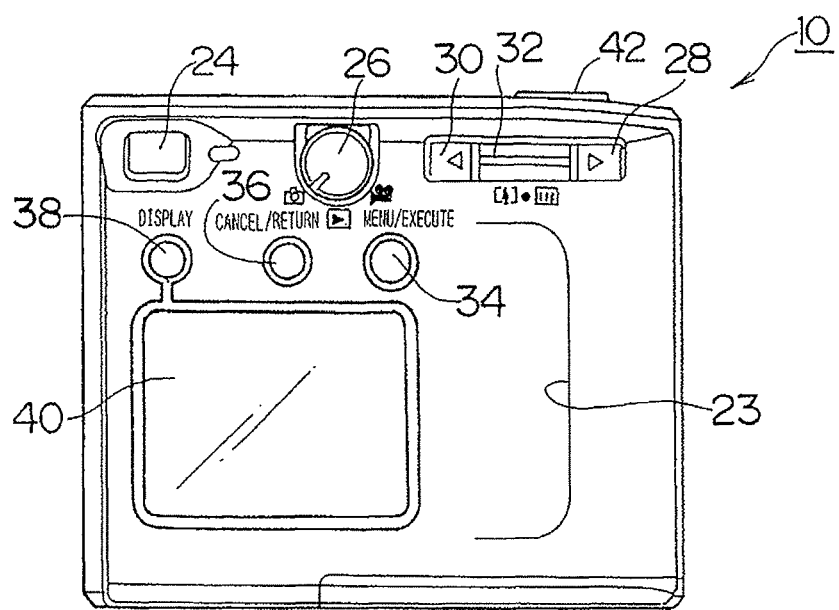
FIG. 2 is a rear view of the digital camera in FIG. 1.

A viewfinder 24, a mode dial 26, a right key 28, a left key 30, an up/down lever 32, a menu/execution key 34, a cancel/return key 36, a display key 38, a liquid crystal monitor 40, and so forth, are provided at a rear face of the digital camera 10 in FIG. 2. A mode dial 26 changes functions of the camera in a camera mode, and a still image mode for recording a still image, a play mode for playing a photographed image, or a moving image mode for recording a moving image is set by rotating the mode dial 26.

The right key 28, the left key 30, and the up/down lever 32 can input instructions of the four directions (right, left, up, and down). The right key 28 and the left key 30 function as a forward button and a reverse button, respectively, at the time of the play mode. The up/down lever 32 functions as a zoom lever for adjusting a magnification of an electronic zoom at the time of a camera mode. The right key 28, the left key 30, and the up/down lever 32 function as operation buttons for selecting a menu from a menu list and for selecting the respective setting sections in the respective menu when a menu mode is set by the menu/execution key 34.

The menu/execution key 34 is used for shifting from a normal screen of the respective menu to a screen of one of the menu, or for instructing a designation of the contents of the selection and execution (confirmation) of a process.

The cancel/return key 36 is used for canceling an item which has been selected from the menu (cancellation) or for returning a previous operating state.

The liquid crystal monitor 40 can be used as an electronic finder for confirming an angle of view, and also can display an image and the like which are read out from a recorded image or a memory card (reference number 72 in FIG. 6) loaded in the camera. A display screen of the liquid crystal monitor 40 is used for selecting menu and for setting the respective setting items by using the right key 28, the left key 30, and the up/down lever 32. Moreover, the liquid crystal monitor 40 displays information such as the number of photographable images, an image number of the reproduced image, presence of the electronic flash, a macro mode, image compression rates (quality), and a number of pixels.

A shutter release button 42, a mode setting switch 44 which is also used as a power switch, and a strobe button 46 are provided on a top face of the digital camera 10. To record a moving image, the shutter release button 42 is used also as a record button (a start/stop button for recording a moving image).

Figure 3:
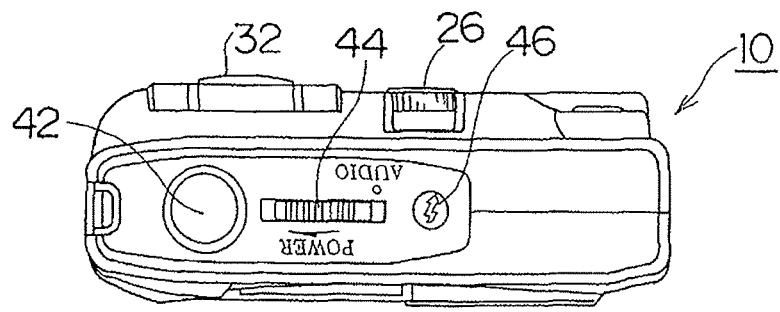
FIG. 3 is plan view of the digital camera in FIG. 1.

The mode setting switch 44 in FIG. 3 is a slidable switch which is locked when moved to the right (moved at a audio mode position), but is not locked when moved to the left. When the mode setting switch 44 is moved to the right to be locked, an audio mode is set, and each time the mode setting switch 44 is moved to the left, the camera mode and an OFF mode for turning off the power within the camera are alternately set.

In a case where the audio mode is set by the mode setting switch 44, the respective types of switches of the camera do not function, and only a switch of a remote control (not shown) is accepted which has an earphone (headphone) connected with a remote control terminal described later (reference number 56 in FIG. 5). In a case where the remote control is not connected with the remote control terminal 56 despite that the audio mode is set by the mode setting switch 44, the power of the camera is still turned off, and the power of the camera is turned ON by operating the remote control after connecting the remote control with the remote control terminal 56.

Figure 4:
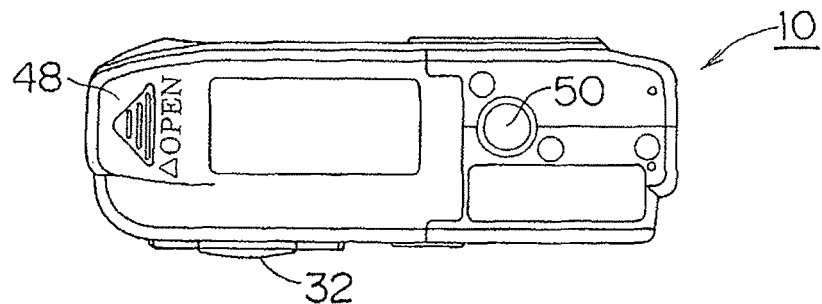
FIG. 4 is a bottom view of the digital camera in FIG. 1.

A battery cover 48 which also serves as a slot cover for the memory card (a smart media in the present example) and a screw hole 50 for a tripod are provided to the bottom face of the digital camera in FIG. 4. A speaker 52, an audio/video output (VIDEO OUT) terminal 54, the remote control terminal 56 including an audio output terminal, a digital (USB) terminal 58, and a power input terminal 50 are provided at a side face of the digital camera 10 in FIG. 5.

Figure 6:
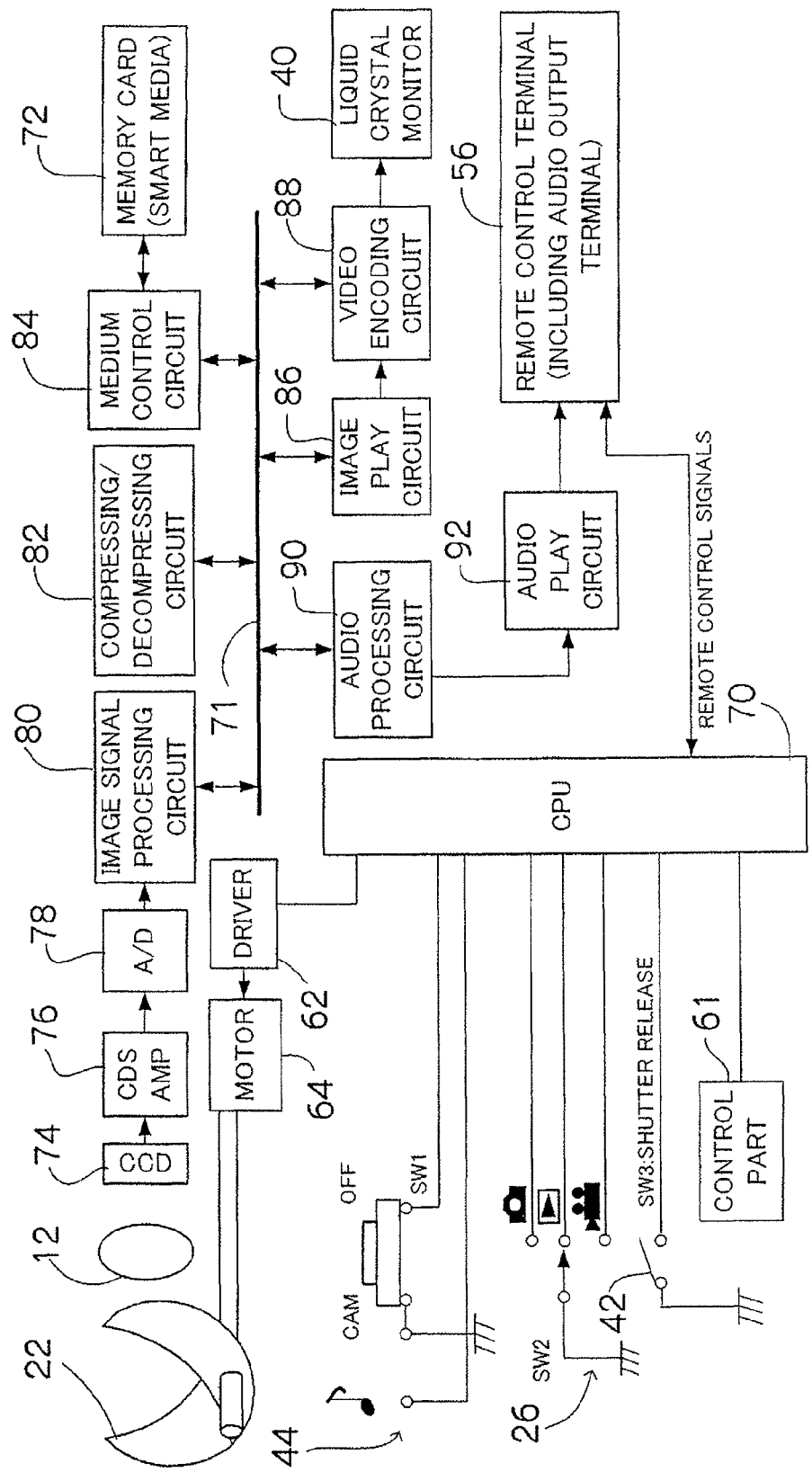
FIG. 6 is a block diagram showing an inner structure of the digital camera of the present embodiment.

FIG. 6 is a block diagram showing an inner structure of the digital camera 10. In FIG. 6, a central processing unit (hereafter called a CPU) 70 controls the respective circuits within the digital camera 10 in accordance with inputs from the mode setting switch 44, the mode dial 26, the shutter release button 42, an operation part 61, and the remote control which is not shown. The operation part 61 is a block which includes input operation means such as the above-mentioned right key 28, left key 30, up/down lever 32, menu/execute key 34, cancel/return key 36, and display key 38. A reference number 71 is assigned to an inner bus.

When the mode setting switch is set from the OFF mode to the camera mode, the CPU 70 detects the setting, and turns on the power within the camera while controlling to open the lens cover 22. When the mode setting switch 44 is set from the camera mode to the OFF mode or to the audio mode, the CPU 70 detects the setting, and controls to completely close the lens cover 22.

In order to open the lens cover at that time, the CPU 70 outputs a signal for rotating a motor 64 forward via a driver 62, whereas the CPU 70 outputs a signal for rotating the motor 64 in reverse in order to completely close the lens cover 22. The CPU 70 also controls the taking lens 12 to move at a collapsing position before completely closing the lens cover 22.

When the shutter release button 42 is pressed after the camera mode is set by the mode setting switch 44 and the still image mode is set by the mode dial 62, the CPU 70 detects the setting and instructs the digital camera 10 to perform a still recording, then records image data of one image obtained by the recording in the memory card 72. In other words, the CPU 70 controls focusing as well as exposure, and forms a subject light on a light receiving surface of a solid state imaging device (hereafter called CCD) 74 through the taking lens 12.

The CCD 74 converts the subject light formed on the light receiving surface into a signal charge in an amount corresponding with an amount of the subject light, and the signal charge accumulated in this manner is sequentially read out as a voltage signal corresponding with the signal charge. The voltage signal sequentially read out from the CCD 74 is added to a coefficient double sampling circuit (CDS circuit) 76, and R, G, and B signals for the respective pixels are processed through a sampling holding and are amplified, then are added to an A/D converter 78. The A/D converter 78 converts the R, G, and B signals which are sequentially added from the CDS circuit 76 into digital R, G, and B signals of 10 bits (0-1023) and outputs the digital R, G, and B signals to an image signal processing circuit 80.

The image signal processing circuit 80 performs the predetermined image processes such as a synchronization for converting the dot-sequential R, G, and B signals added from the A/D converter 78 into synchronized signals, a white balance adjustment, a gamma correction, and a YC signal processing. A brightness signal Y and a chroma signal Cr and Cb (YC signal) which are produced by the YC signal processing of the image signal processing circuit 80 are recorded in the memory card 72 via a medium control circuit 84 after being compressed into a predetermined format (e.g. JPEG format) by a compressing/decompressing circuit 82.

The storage medium is not limited to the smart media; a PC card, a compact flash, a magnetic disk, an optical disk, an optical magnetic disk, a memory stick, and the like; a variety of readable and writable media may be used in accordance with electronic, magnetic, optical formats, or combinations of the formats. A signal processing device and an interface corresponding with a medium being used are applied. A structure is also acceptable in which plural storage media are attachable to a body of the camera regardless of types of the storage media. In addition, a device for storing the image data and the music data is not limited to a removable medium which can be attached and detached to and from the body of the camera but may be a storage medium (inner memory) which is built in the camera.

When the camera mode is set by the mode setting switch 44 and the moving image mode is set by the mode dial 26, recording of the moving image is possible, and a recording operation starts by pressing down the shutter release button 42. If the shutter release button 42 is pressed again, the recording stops. Another recording operation may be possible in which the recording is performed while pressing the shutter release button 42 continuously, and the recording stops by releasing the pressing. Moving image data is recorded in the memory card 72 in a motion JPEG format, for example.

On the other hand, when the camera mode is set by the mode setting switch 44 and the play is set by the mode dial 26, an image file of the last image which is recorded in the memory card 72 is read out via the medium control circuit 84. Compressed data of the read out image file is decompressed into YC signals via the compressing/decompressing circuit 82.

Figure 5:
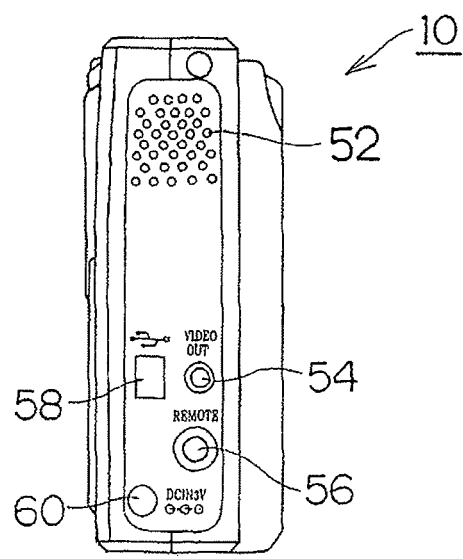
FIG. 5 is a right-side view of the digital camera in FIG. 1.

The YC signals are converted into color composition video signals in the NTSC format via an image play circuit 86 and a video encoding circuit 88, and is outputted to the liquid monitor 40 as well as the audio/video output terminal 54 (refer to FIG. 5). By the process, an image of the last image which is recorded in the memory card 72 is displayed on the liquid crystal monitor 40, whereas an image of the last image is displayed on a TV (not shown) if the TV is connected with the audio/video image output terminal 54.

After that, when the right key 28 is pressed, images are sequentially fed, and when the left key 30 is pressed, the images are fed in reverse. The image file at a position of a fed image is read out from the memory card 72, and the image is played on the liquid crystal monitor 40 in the same manner as described above. When the images are sequentially fed while the image of the last image is displayed, the image file of the first image which is recorded in the memory card 72 is read out, and the image of the first image is played in an image display device such as the liquid crystal monitor or the TV.

If the file to be reproduced is a moving image file, the top image of the moving image is displayed as a representative image, and the screen changes to a screen to receive an instruction for starting play of the moving image.

Next, an audio play function of the digital camera 10 will be described. The audio play function plays a music file recorded in a format such as the MP3 (MPEG-1 Audio Layer-III) in the memory card 72. When the audio mode is set by the mode setting switch 44 and the remote control with an earphone is connected with the remote control terminal 56 in that state, the power within the camera is turned on, so the audio play is possible. In the audio mode, the CPU 70 receives a remote control signal only from the remote control, and thus does not accept any switch inputs except inputs from the mode setting switch which is also used as a power switch for the camera.

When a play button of the remote control is pressed while the digital camera 10 is set at the audio mode, the music file is read out from the memory card 72 via the medium control circuit 84. Assume that the music file is directly downloaded into the memory card 72 from a personal computer, or via the digital (USB) terminal 58 (refer to FIG. 5) of the digital camera 10.

The compressed data of the image file which is read out from the memory card 72 is decompressed to music data via the compressing/decompressing circuit 82. The music data goes through processes such as D/A conversion by an audio processing circuit 90, and is converted into an analog audio signal. The converted audio signal is amplified by an audio play circuit 92, and is outputted as audio via an audio output terminal and an earphone (not shown) within the remote control terminal 56.

A procedure will be described from now on for setting an image quality of the digital camera 10 which is constructed as described above. When the user turns on the mode setting switch 44 which is also used as a power switch, the digital camera is activated in the camera mode. The digital camera 10 is in a state in which recording is possible after setting the still image mode or the moving image mode by the mode dial 26.

When the user presses the display key 38 at that time, the liquid crystal 40 displays a real time image which is captured by the CCD 74. When the mode dial 26 is set, the image data is read out from the memory card 72, and the liquid crystal display 40 displays one image which is most recently recorded.

When the user presses the menu/execute key in the respective still image mode, moving image mode, and play mode, a menu screen corresponding with the modes is displayed. For example, when the user presses the menu/execute key 34 in the still image mode (or under the moving image mode), menu items related to the still image mode (or the moving image mode) are displayed; assume that an item for "image quality setting" is included in the menu items. When the item "image quality setting" is selected by the right key 28, the left key 30, or the up/down lever 32, a menu screen for image quality setting is displayed as shown in FIG. 7 (*a*).

In the present example, the number of imaging pixels can be selected from 2400×1800, 1280×960 and 640×480; the image compression rates can be selected from the three types: Fine mode, Normal mode, and Basic mode. Order of listing the image quality in those modes is from superior to poor: the Fine mode for the best, the Normal mode for the second best, and the Basic mode for the third. For example, the Fine mode corresponds with ¼ (JPEG) compression, the Normal mode corresponds with ⅛ (JPEG) compression, and the Basic mode corresponds with ¹⁄₁₆ (JPEG) compression.

Suppose that the "compression rate" is a rate of amount of data after being compressed with respect to an amount of the original data, the larger the compression rate, the less (lower) the level of compression is, thus the better the image quality is. On the other hand, if the denominator of a fraction where the amount of the original data is compared with the amount of the data after the compression is defined as a "compression rate", the larger the denominator is, the lower the image quality is.

Some of the cameras may have so-called an uncompression mode which does not perform the compression. The uncompression is a case where the compression of the best image quality is selected; thus, selecting the uncompression mode is also considered as "selecting the compression rate".

In the menu screen in FIG. 7, the number of imaging pixels is indicated as "pixel" and the image compression rate is indicated as "quality", and 2400×1800, 1280×960, and 640×480 are indicates as "2400", "1280", and "640", respectively. In the menu screen, a cursor points at a position of a combination of the number of pixels and the compression rate related to the current setting. A color of the position of the cursor in FIG. 7 changes to a different color so as to be distinguished from colors of other items displayed on the screen.

In FIG. 7(*a*), the cursor is at a position of "pixel=2400" and "quality=Normal". When the user presses the right key 28 or the left key 30 in that state, the compression rate can be changed while unchanging the number of pixels "2400". For example, when the user presses the right key 28, the cursor is at a position of "Basic" as shown in FIG. 7(*b*), and when the user presses the left key 30 in the state of FIG. 7(*b*), the display returns to the display in FIG. 7(*a*).

On the current cursor position (e.g. "Normal" in FIG. 7(*a*) and "Basic" in FIG. 7(*b*)), a "triangle pointed to the right" 94R and a "triangle pointed to the left" 94L indicate to the user that the compression rates can be changed by operating the right key 28 or the left key 30. However, a corresponding triangle is not displayed when the operation with keys is not valid.

The number of pixels is changed by moving the up/down lever 32. Moving up the up/down lever 32 means pressing down an up key whereas moving down the up/down lever 32 means pressing down a down key. When the number of pixels is changed by the up/down lever 32, selectable candidates for the compression rates in the selected number of pixels are displayed and at the same time the position of the cursor moves. When the user moves down the up/down lever 32 in the screen of FIG. 7(*a*) so as to change the number of pixels to "1280", the candidates for the compression rate related to "2400" disappears from the screen, and instead the selectable candidates for the compression rate related to "1280" appears on the screen. If the number of pixels is "1280" in this example, one of "Fine" or "Normal" can be selected but not "Basic", so "Basic" is not displayed.

The cursor is at a position of the compression rate which has been most recently set in "1280" (in this case "Fine"). If there is no history of setting, the cursor is positioned at a suitable default position (or if possible, a position which is currently set). As to changing the number of pixels, a "pointed-down triangle" 96D or a "pointed-up triangle" 96U or both are displayed at the right of the current position of the cursor, and they indicate to the user that the number of pixels can be changed by moving the up/down lever 32. If the key is not valid, the corresponding triangle is not displayed.

The compression rate can be changed to "Normal" as shown in FIG. 7(*d*) by operating the right key 28 (in this case only the right key 28 is valid) in FIG. 7(*c*). The display returns to the display in FIG. 7(*c*) by pressing the left key 30 in FIG. 7(*d*).

When the user moves down the up/down lever 32 in a state of FIGS. 7(*c*) and 7(*d*), the cursor moves at a position of the number of pixels "640" in FIG. 7(*e*), and the selectable candidates for the compression rate related to "1280" disappears from the screen, then instead the selectable candidates for the compression rate for "640" appears on the screen. In the present example, only "Normal" can be designated in the number of pixels "640", and "Fine" and "Basic" cannot be selected; thus only "Normal" is displayed, and other candidates are not displayed.

The digital camera 10 limits the selectable compression rates depending on the number of pixels; however, all the compression rates may be selected for the respective number of pixels. In other words, the three types of compression rates may be selected with respect to the three types of number of pixels, so there are nine combinations to be selected in total. The number of selectable candidates can be so designed as to be suitable depending on a case; a two-dimensional display is possible as long as one of the number of pixels and the compression rate has more than two types of selectable candidates. Distinguishing the candidates by colors is also preferable.

At the bottom row in the image quality setting screen (the menu screen of the pixel/quality setting) in FIGS. 7(*a*)-7(*d*), an operation guidance "set→[execute]" and "stop→[cancel]" are displayed in order to present a method for designating an item in the menu screen. "Execute key", that is, the menu/execute key 34 in FIG. 2 is used for designating the setting at the current cursor position as a set item, and contents of setting are set by pressing down the menu/execute key 34. "Cancel key", that is, the cancel/return key 36 in FIG. 2 is used for returning to a previously set item or for exiting from the menu screen.

If exiting from the menu of the pixel/quality setting, the compression rate which is previously set with respect to the number of pixels except the number of pixels of an item which is designated the last is stored in a nonvolatile memory (e.g. an inner memory of the CPU 70).

If entering into the menu of the next pixel/quality setting and moved on to the number of pixels by operation of the user, the cursor is moved by following the stored data of the nonvolatile memory. Thereby, the previous setting state can be easily reset. The default value of the compression rate which is the selectable candidate for each number of pixels may be specified beforehand, and the cursor is moved at a position indicated by the default value.

Figure 8:
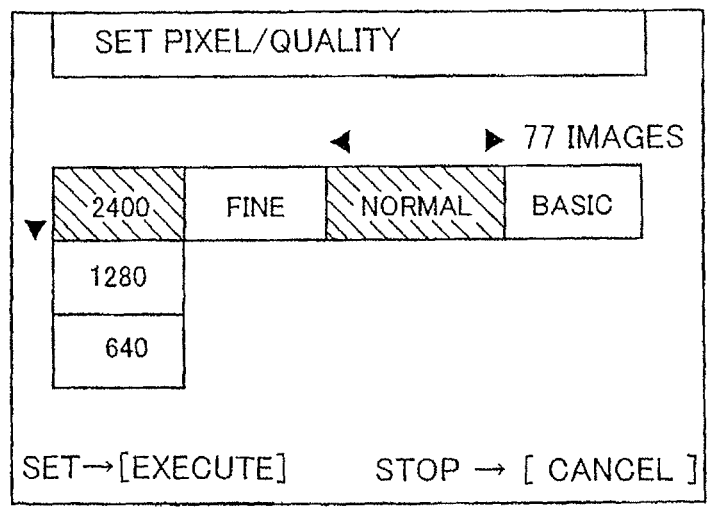
FIG. 8 is a view showing an example of presenting a selectable combination of a number of pixels and a compression rates as well as number of photographable images.

As an alternative one of the above-described embodiment, the number of photographable images is preferably displayed under the setting during which the number of images and the compression rate are selected. The CPU 70 calculates the number of photographable images from capacity of the memory card 72 with respect to combinations of the number of imaging pixels and the image compression rates. The number of photographable images which are thus calculated are displayed in a predetermined position in the setting screen, for example, at the upper right portion of the screen as shown in FIG. 8. FIG. 8 displays a case where images corresponding with 77 still images can be recorded under the set number of pixels "2400" and the set compression rate "Normal".

Figure 9:
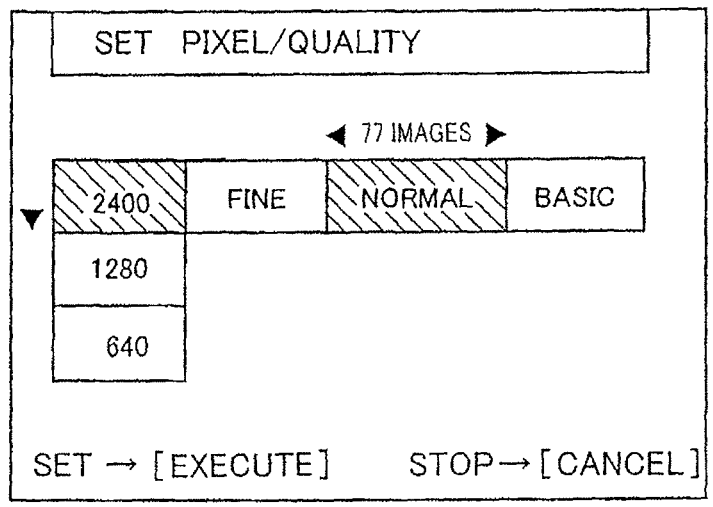
FIG. 9 is a view showing another example of presenting a selectable combination of the number of pixels and the compression rates as well as the number of photographable images.

The position to display the number of photographable images is not limited to the position shown in FIG. 8; the number of photographable images may be displayed at the right bottom portion of the screen, or any blank space other than the area for displaying selectable candidates for the number of pixels and the image compression rates. Moreover, as seen from FIG. 9, the number of photographable images may also be displayed above (or below) the current position of the cursor. In the manner described above, the number of photographable images under combinations related to the selections is displayed before finally deciding the setting for the image quality; thereby the user can designate the image quality in consideration of the number of photographable images.

FIG. 10 shows another embodiment of the present invention in which the three types of number of imaging pixels of 2400×1800, 1280×960 and 640×480 can be selected, and the three types of image compression rates, "Fine", "Normal", and "Basic" can be selected. In the present example in FIG. 10, a cross table on which the selectable candidates "2400", "1280", and "640" for the number of image pixels are lined vertically (column) and the selectable candidates "Fine", "Normal", and "Basic" for the image compressions are lined horizontally (row). In each cell (square) of the table, the number of photographable images in a case of selecting a combination of the number of pixels and the image compression rate corresponding with the cell is displayed. However, due to the use of the camera, a cell corresponding with an unelectable pair of the number of pixels and the image compression rate is not displayed and the cursor does not move.

FIG. 10 shows the maximum number of photographable images in a smart media of 64 MB. For example, with a combination of the number of pixels "2400" and the compression rate of "Normal" corresponding with the current position of the cursor, the number of photographable images is 77 by referring to the capacity of the memory card. Instead of the cursor, a image may be displayed on the corresponding cell.

The user selects the compression rates with the right key 28 or the left key 30, and designates the image quality by selecting the number of image pixels with the up/down lever 32. When selecting, the user can refer to the number of photographable images displayed on the cell.

Each time the image data is stored into the memory card 72, the number of photographable images is preferably calculated again with respect to the residual capacity of the memory card 72 so as to update display. FIG. 11 shows the number of photographable images after one taking under the setting "2400" for the number of pixels and the setting "Normal" for the image compression rate in the state of FIG. 10. If the number of the calculated photographable images is "0 images", the cursor is set to be unmovable with respect to the corresponding cell, or the cell is not displayed in order to avoid selecting. Moreover, a user interface is also possible in which an alarm sounds when the cursor moves at a position indicating the number of photographable images "0 images" so that the user can be informed of changing the setting.

In the embodiment presented in FIG. 7, the selectable candidates for the number of pixels are determined as a reference, and the selectable candidates for the image compression rates with respect to the number of pixels involved in the selection are displayed. In reverse to the embodiment related to FIG. 7, however, an embodiment is allowable in which the selectable candidates for the compression rates are determined as a reference, and the selectable candidates for the number of pixels with respect to the compression rate involved in the selection are presented. For example, as seen from FIG. 12, the selectable candidates for the image compression rates, "Fine", "Normal", and "Basic" are vertically arranged and are displayed on the screen. When the compression rate "Fine" is selected, the selectable candidates for the number of image pixels "2400" and "1280" are horizontally lined and displayed as shown in FIG. 12(a).

When the compression rate "Normal" is selected, the selectable candidates for the number of image pixels "2400", "1280", and "640" are displayed as seen from FIG. 12(b), and when the compression rate "Basic" is selected, "1280" is displayed at a column for the number of pixels as shown in FIG. 12(c). As indicated in the series of FIG. 12, the selectable number of pixels can be limited depending on the compression rates, so the number of image pixels of all types may be selected with respect to each compression rate.

In the embodiment described above, the digital camera with an audio play function is described first; however, the embodiments of the present invention is not limited to such embodiment. The present invention can also be applied to a digital still camera which is exclusively used for recording still images, a digital moving image camera which is exclusively used for recording moving images, and a video camera which can record both still images and moving images.

Now, an alternative one of the embodiments described above will be illustrated.

When the user selects a desired number of pixels and compression rate on the menu screen for the image quality selection, a state of the storage medium (e.g. recordable capacity) is checked, and the number of photographable still images and the remaining time for taking a moving image under the image quality involved in the selecting are preferably calculated so as to display information related to the number of photographable images and the remaining time for taking a moving image.

FIG. 13 shows an example of the display screen to which a display of the remaining time for taking a moving image is added. The image quality for the photographed still image can be selected in the menu screen of the image quality selection, and the image quality of the moving image is supposed to be fixed. The number of photographable images is displayed in each cell (selectable cell) of the table in which the selectable candidates for the number of pixels and the image compression rates are presented in a two-dimensional manner, and the remaining time for taking a moving image is displayed (40 seconds in the present case) at the upper right portion out of the column in the table. A cell with an unselectable combination is not displayed, and the cursor is prohibited from moving to the position of the cell, or the user is informed by an alarm that the cell cannot be selected. FIG. 13 indicates the maximum number of photographable images in an unrecorded recording card of the smart media of 64 MB.

FIG. 14 shows contents of the screen which displays the number of photographable images and the remaining time for taking a moving image after recording a moving image for 80 seconds in the moving image mode in the state of FIG. 13. The remaining time for taking a moving image is then "330 seconds", and the number of photographable images is calculated again corresponding with a used amount of the storage medium accompanied by recording the moving image. Display is constantly updated by checking the residual amount of the storage medium.

FIG. 15 shows an example in which recording a still image, recording a moving image, and changing the image quality are all possible. In FIG. 15, the number of pixels "1280" and "640" are selectable with regard to taking a moving image. In this case, the three types of compression rates, "Fine", "Normal", and "Basic" can be selected when the number of pixels is "1280" while the compression rate to be selected is only "Fine" when the compression rate is "640". Patterns of selectable combinations are not limited to the one mentioned above, and may be designed to suit the use of the camera.

The number of photographable images as well as the remaining time for recording a moving image are displayed in each cell of the table which displays the selectable candidates for the number of pixels and compression rates in the two-dimensional manner. In FIG. 15, the number of photographable images is displayed at an upper level of each cell while the remaining time for recording a moving image is displayed at a lower level of the cell. For example, with the number of pixels "2400" and the compression rate "Normal", the number of photographable images=77 images and the remaining time for recording a moving image=12 seconds.

FIG. 16 shows still another example for displaying the remaining time for recording a moving image. As described with regard to the embodiment in FIG. 7, in a case with a menu format which represents the selectable candidates for the compression rates under the number of pixels involved in the selecting, the number of pixels is selected first in the image quality selection and the number of photographable images and the remaining time for recording a moving image which are pointed by the cursor are simultaneously displayed at the upper right portion out of the column where the selectable candidates are displayed in the same manner as in FIG. 13. The cursor in FIG. 16(a) points a position of the combination of the number of pixels "2400" and the compression rate "Normal", the cursor in FIG. 17(b) points a position of the combination of the number of pixels "1280" and the compression rate "Normal", and the cursor in FIG. 17(c) points a position of the combination of the number of pixels "640" and the compression rate "Normal".

FIG. 16 indicates an example in which the image quality selection of the still image to be photographed is possible whereas the image quality selection of a moving image to be taken is not possible (the image quality for the moving image is fixed); however, if the image quality of the moving image can be changed, the display for the remaining time for recording a moving image is also changed in accordance with the combinations involved in the selecting. In that case, if the calculated remaining time for recording a moving image is "0 seconds", the time is not displayed, or the user is informed by an alarm that recording of the moving image is not possible.

FIG. 16 indicates the menu format in which the compression rate is selected corresponding with selecting of the number of pixels by determining the selectable candidates for the number of pixels as the reference. Likewise, as seen from FIG. 17, a menu format is also applicable which presents the selectable candidates for the number of pixels corresponding with selecting of the compression rates by determining the selectable candidates for the compression rates as the reference.

Moreover, another embodiment is also possible in which the remaining time for recording a music file (hereunder called a remaining time for registering the music file) is calculated from the capacity of the storage medium, and information of the remaining time for registering the music file is displayed as well as the number of photographable images and the remaining time for recording a moving image. Further, if setting of the sound quality can be changed when the music file is recorded, the present invention can be applied to the screen for changing the setting.

For example, in a case where the quality of sound at the time of recording the music file is specified by the two parameters, the number of sampling (number of sound data) and the compression rate, the selectable candidates for the number of sampling and the compression rates are displayed in the two-dimensional manner, and the user can designate a desired combination from the display screen. The remaining time for registering the music file with respect to the combinations of the number of sampling and the compression rates to be selected is displayed on the display screen. By this embodiment, the user can easily set the sound quality by referring to the remaining time for registering the music file.

As described above, according to the image quality selecting method and the digital camera of the present invention, the selectable candidates for the number of imaging pixels and the image compression rates which are prepared beforehand are displayed in a two-dimensional arrangement; thus the user can understand at once the contents of the combinations of the number of imaging pixels and the image compression rates, and can easily designate the image quality.

Furthermore, according to the present invention, the number of photographable images and the remaining time for recording a moving image are calculated with respect to each selectable combination of the number of imaging pixels and the image compression rates, and the number of photographable images and the remaining time for recording a moving image are displayed on the selecting screen. Therefore, the user can designate the image quality by referring to the display (the displayed number of photographable images and the remaining time for recording a moving image).

In a conventional camera, the number of photographable images and the remaining time for recording a moving image could not be determined unless setting of the number of pixels and the compression rates is selected. However, according to the present invention, the number of photographable images and the remaining time for recording a moving image are displayed when the number of pixels and the image compression rates are selected, whereby the user is aided when determining the image quality.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image quality selecting method, comprising:
    displaying a plurality of combinations of a selectable candidate for a number of imaging pixels and image compression rate on a setting screen for setting an image quality, wherein each combination of a selectable candidate is individually selectable for setting both the number of imaging pixels and the image compression rate;
    receiving an operation of selecting a desired combination of a selectable candidate on the screen among the combination of the desired selectable candidate for a number of imaging pixels and image compression rate displayed on the setting screen;
    calculating a number of photographable images with respect to the combination of the selectable candidate for the number of imaging pixels and image compression rate; and
    displaying the calculated number of photographable images on the setting screen.

2. The image quality selecting method of claim 1, wherein a number of photographable images is calculated with respect to the selected combination of the desired selectable candidate for the number of imaging pixels and image compression rate, and the calculated number of photographable images is displayed on the setting screen.

3. The image quality selecting method of claim 1, further comprising:
    receiving an operation for designating a setting by the selected combination of the number of imaging pixels and image compression rate; and
    changing a setting into a number of imaging pixels and image compression rate related to the selection by operating the operation to designate.

4. A digital camera, comprising:
    a taking lens;
    an imaging device that converts light which enters through said taking lens into electric signals;
    a signal processing part for processing the signals outputted from said imaging device;
    a recording instruction input operation part that instructs start of recording in order to obtain an image;
    a recording device that records an image in a storage medium, the image being photographed in response to an operation of said recording instruction input operation part;
    a display device that displays a setting screen for setting an image quality;
    a display control device that displays a plurality of combinations of a selectable candidate for a number of imaging pixels and image compression rate on the setting screen, wherein each combination of a selectable candidate is individually selectable for setting both the number of imaging pixels and the image compression rate;
    a device for performing an operation to select a desired combination of selectable candidate on the setting screen among the combination of the selectable candidate for a number of imaging pixels and image compression rate displayed on the screen; and
    a calculating device that calculates a number of photographable images with regards to the combination of the selectable candidate of a number of imaging pixels and image compression rate, wherein the number of photographable images calculated by the calculating device is displayed on the setting screen.

5. The digital camera of claim 4, wherein a number of photographable images is calculated with respect to the selected combination of the selectable candidate for the number of imaging pixels and image compression rate, and
wherein the calculated number of photographable images is displayed on the setting screen.

6. The digital camera of claim 4, further comprising:
a designation instruction device for performing operation to designate the setting by the selected combination of the number of imaging pixels and image compression rate; and
an image quality setting device that changes a setting to a number of pixels and the image compression rate related to the selection in accordance with a designation instruction from the designation instruction device.

7. An image quality selecting method, comprising:
displaying a combination of selectable candidates for a number of imaging pixels and image compression rate on a setting screen for setting an image quality, wherein each candidate is individually selectable;
receiving an operation of selecting a desired combination of a selectable candidate on the screen among the combination of the desired selectable candidate for a number of imaging pixels and image compression rate displayed on the setting screen;
calculating a number of photographable images with respect to the combination of the selectable candidate for the number of imaging pixels and image compression rate; and
displaying the calculated number of photographable images on the setting screen, wherein a plurality of combinations of the selectable candidate for the number of imaging pixels and image compression rate are displayed on the setting screen,
wherein a number of photographable images is calculated for each of the plurality of combinations that are simultaneously displayed, and
wherein the calculated number of photographable images for each of the plurality of combinations are simultaneously displayed on the setting screen.

8. A digital camera, comprising:
a taking lens;
an imaging device that converts light which enters through said taking lens into electric signals;
a signal processing part for processing the signals outputted from said imaging device;
a recording instruction input operation part that instructs start of recording in order to obtain an image;
a recording device that records an image in a storage medium, the image being photographed in response to an operation of said recording instruction input operation part;
a display device that displays a setting screen for setting an image quality;
a display control device that displays a combination of selectable candidates for a number of imaging pixels and image compression rate on the setting screen, wherein each candidate is individually selectable;
a device for performing an operation to select a desired combination of selectable candidate on the setting screen among the combination of the selectable candidate for a number of imaging pixels and image compression rate displayed on the screen; and
a calculating device that calculates a number of photographable images with regards to the combination of the selectable candidate of a number of imaging pixels and image compression rate, wherein the number of photographable images calculated by the calculating device is displayed on the setting screen, wherein a plurality of combinations of the selectable candidate for the number of imaging pixels and image compression rate are displayed on the setting screen,
wherein a number of photographable images is calculated for each of the plurality of combinations that are simultaneously displayed, and
wherein the calculated number of photographable images for each of the plurality of combinations are simultaneously displayed on the setting screen.

* * * * *